Nov. 29, 1960 F. R. WILSON 2,962,079
TUBE FORMING TOOL
Filed Jan. 28, 1955 2 Sheets-Sheet 2
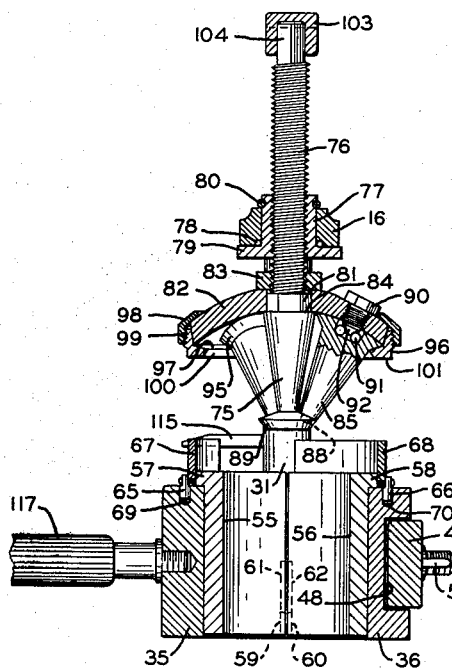
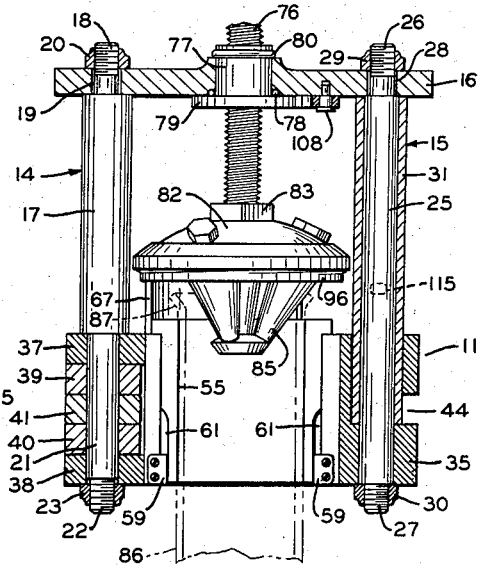
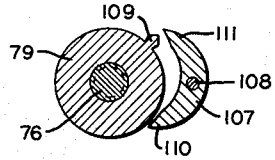
INVENTOR.
FRANK R. WILSON
BY
DES JARDINS, ROBINSON & KEISER
HIS ATTORNEYS

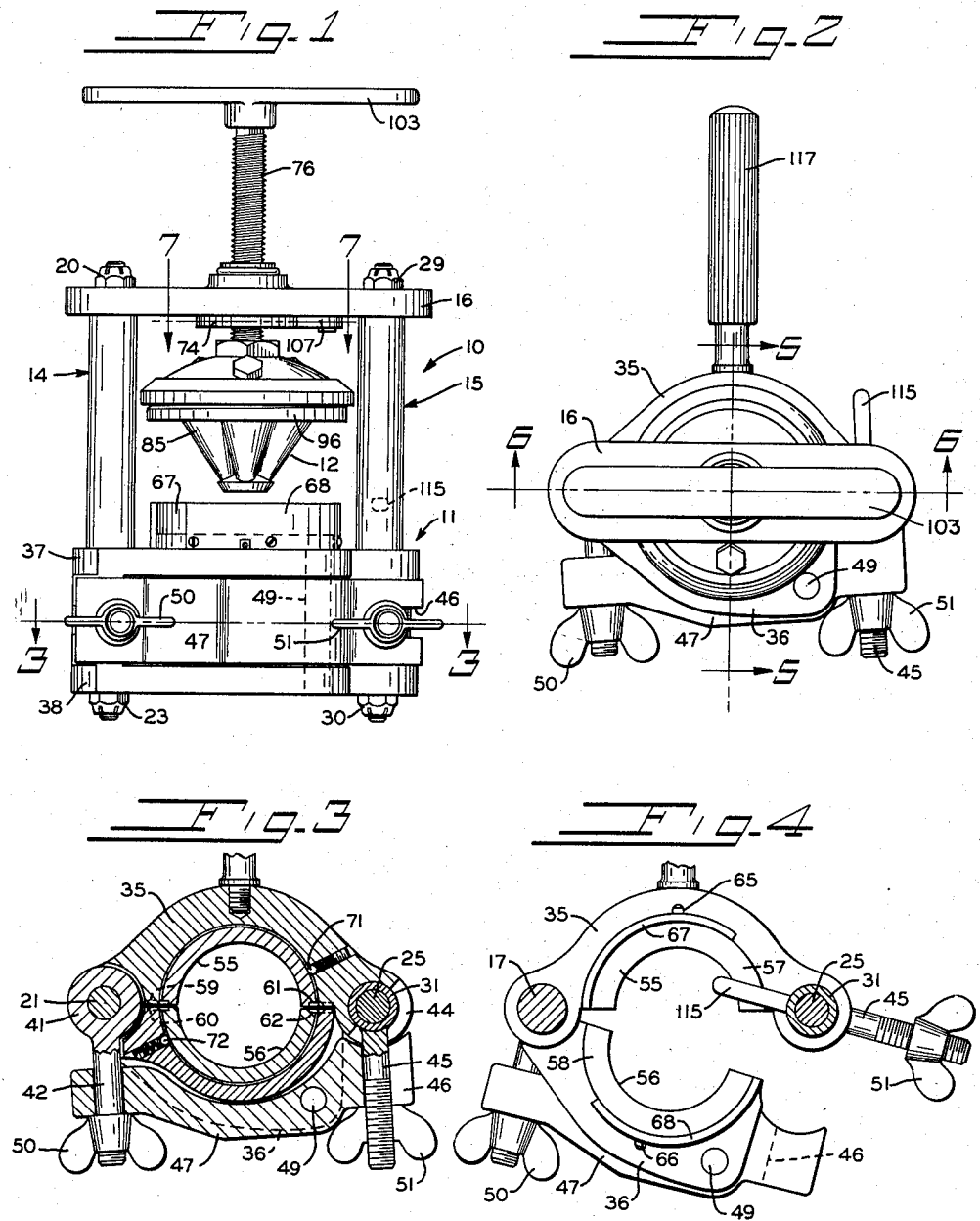

United States Patent Office 2,962,079
Patented Nov. 29, 1960

2,962,079

TUBE FORMING TOOL

Frank R. Wilson, 4948 Briarcliff Road, Memphis, Tenn., assignor to Quinn Esther Wilson Filed Jan. 28, 1955, Ser. No. 484,721

6 Claims. (Cl. 153—81)

This invention relates to tube forming tools and, more particularly, to improvements in tools adapted to operate on the ends of tubes held in position beneath the tube forming element of the tool by a clamping device.

In the past it has been found difficult to prevent slippage of the tubing in the clamping devices of the larger sizes of tube forming tools due to the inability of the workman to apply sufficient clamping pressure on the tubing by the usual tightening means provided for this purpose. To overcome this problem of slippage of the tubing within the clamping device, I have devised a tool having a clamping means in which a compound lever is provided for greatly increasing the clamping pressure which may be exerted on the tubing by the tightening of a wing nut or other tightening device. Another difficulty encountered with tube forming tools designed for handling the larger sizes of tubing is that the clamping members customarily employed for holding the tubing in place within the tool are large and heavy and render the tool unwieldy and awkward to use. To provide a compact and light weight tool for handling the larger tubing sizes, I have provided a clamping device which is provided with removable inserts for accommodating it to the different sizes of tubing to be formed by the tool. In my device, special provision is made for facilitating the insertion and removal of the inserts while, at the same time, insuring their firm retention in the clamping device. Each insert also has its own means for correctly gauging the depth of the flare to be produced on the tube for that particular size of insert. The flaring cone of the tool is provided with a bearing ring for contacting the gauging means on the inserts to thereby limit downward travel of the cone into the tube.

Accordingly, it is an object of my invention to provide an improved tube working tool for handling large sized tubing.

Another object of my invention is to provide an improved form of clamping device for holding the tube securely in place within the tool.

Another object of my invention is to provide a tube clamping means in which inserts of differing inside diameters may be fitted for handling the various sizes of tubing.

Another object of my invention is to provide an improved means for retaining the inserts in place in the tube clamping device.

Another object of my invention is to provide a tube flaring tool having novel gauging means for insuring the formation of flares of the correct depth for each of the different sizes of tubing handled by the tool.

Another object of my invention is to provide a gauge on each tube clamping insert for limiting the downward travel of the forming element into the tube.

Another object of the invention is to provide a novel bearing ring on the tube forming element which is adapted to contact a gauge carried by the tube clamping insert and so limit downward feeding movement of the element.

With these, and other objects in view, which will become apparent from the following description, the invention includes certain novel features of construction and combinations of parts the essential element of which are set forth in the appended claims and a preferred form or embodiment of which will hereinafter be described with reference to the drawings which accompany and form a part of this specification.

In the drawings:

Fig. 1 is a side elevation of my improved form of tube forming tool.

Fig. 2 is a top plan view of the tool shown in Fig. 1.

Fig. 3 is a cross-sectional view taken along the line 3—3 in Fig. 1.

Fig. 4 is a top plan view of the tube clamping means of the tool shown in the preceding figures.

Fig. 5 is a cross-sectional view taken along the line 5—5 in Fig. 2.

Fig. 6 is a cross-sectional view taken along the line 6—6 in Fig. 2.

Fig. 7 is a cross-sectional view taken along the line 7—7 in Fig. 1.

Referring to Fig. 1 of the drawings, it will be seen that the tube working tool forming the subject-matter of this application is comprised of three principal parts, namely a yoke 10, a tube clamping means 11 fastened to the legs of the yoke, and a flaring cone 12 supported on the yoke for feeding movement toward and away from the end of the tube held in the clamping means.

As mentioned earlier herein, this tool is especially suitable for forming the larger sizes of tubing, for example, those having an outside diameter of one inch or more.

In this tool, the yoke 10 is comprised of a pair of legs 14 and 15 which are connected at their upper ends by a crossbar 16. As best shown in Fig. 6, the leg 14 is comprised of a rod or bar 17 provided on its upper end with a threaded tenon 18 which extends through an oversize hole in one end of the crossbar 16 where it is provided with a stop nut 20 for holding the crossbar thereon. The lower end of the bar 17 is provided with a tenon 21 threaded at 22 for receiving a nut 23.

The leg 15, on the other hand, is comprised of an axle 25 provided with threaded tenons 26 and 27 at its upper and lower ends, respectively. The tenon 26 extends through an oversize hole 28 in crossbar 16 and is fitted with a stop nut 29 for holding the crossbar thereon. At its lower end, the axle 25 is received in a bore provided in the jaw 35 and a nut 30 is screwed onto the tenon 27 to fasten the leg to the clamping means 11. A sleeve 31 is journaled on the axle 25 so as to be free to rotate with respect to the crossbar 16 and clamping means 11.

The clamping means 11 consists essentially of a pair of clamping members or jaws 35 and 36 (Fig. 4) which are hinged at one end on the tenon 21 (Fig. 6) of the rod 17 which thereby serves as a hinge pin for the jaws. As shown in Figs. 4 and 6, the rear jaw 35 is provided with a pair of spaced ears 37 and 38 which are apertured to receive the tenon 21, while the forward jaw 36 has a pair of spaced ears 39 and 40 which engage snugly between the ears 37 and 38 and are likewise apertured to receive the tenon 21. Also pivoted on the tenon is the head 41 (see, also, Fig. 3) of an eye-bolt 42.

The jaws 35 and 36 of the clamping means are adapted to be drawn together by a swing-bolt 45 which is welded or otherwise secured to the sleeve 31, as indicated in Fig. 3, and which swings in a notch 44 milled in the jaw 35. Hence, the bolt may be swung from the Fig. 3 position to the Fig. 4 position to permit opening the jaws, the sleeve 31 rotating on the axle 25 when the bolt 45 is swung outward. When the bolt is swung to its closed position as shown in Fig. 3, it is adapted to enter a notch 46 provided in one end of a tightening lever 47 which lies within a groove or a recess 48 formed in the jaw 36. The lever 47 is pivoted on a pin 49 which passes vertically through the lever and seats in bores provided therefor in the upper and lower portions of the jaw 36. The other end of the lever 47 is apertured to receive the eye-bolt 42 which is fitted with a wing nut 50 for applying pressure to the end of the lever. The swing-bolt 45 is likewise provided with a wing nut 51 for tightening the jaws after they have been closed on the tubing to be formed by the tool. To clamp a piece of tubing in the device, the wing nut 51 is first tightened to apply an initial clamping pressure on the tubing, after which the wing nut 50 is tightened to exert a greatly increased pressure on the tube due to the mechanical advantage afforded by the lever 47. To remove the tube from the clamping means, the reverse procedure is followed, the wing nut 50 being loosened first and thereafter the wing nut 51 to permit the swing-bolt to be swung to the Fig. 4 position and the jaws opened.

To accommodate the clamping means to tubing of various sizes, the jaws 35 and 36 are arranged to receive and retain therein tube clamping inserts 55 and 56. As shown in Figs. 4 and 5, these inserts are each semi-cylindrical in form so as to provide a cylindrical clamping recess when the jaws are closed as shown in Fig. 3. At their upper ends the inserts 55 and 56 are provided with lips or flanges 57 and 58 which contact the top faces of the jaws 35 and 36 when the inserts are positioned therein. Each insert is held in place within its respective clamping jaw by a pair of retaining lugs projecting inwardly from the jaw, the lugs for the jaw 35 being numbered 59, and those for the jaw 36 being numbered 60. As shown in Fig. 6 of the drawings, the lugs are short in the axial direction as compared with the length of the recesses and are disposed adjacent the bottom edges of the jaws so as to enable quick insertion and removal of the inserts from the jaws. Each insert is provided on its marginal edge with a pair of longitudinally extending grooves for receiving the retaining lugs, the grooves for the insert 55 being indicated by reference numeral 61 and the grooves for the insert 56 being indicated by reference numeral 62. Hence, when the inserts are slipped into the jaws with the grooves lying behind the lugs 59 and 60 the surfaces forming the bottoms of the grooves will constitute contact faces adapted to engage with the lugs so that the inserts will be retained in place in the jaws and prevented from dislodgement during opening and closing movements of the jaws.

A further means for retaining the inserts 55 and 56 in place includes longitudinally or axially extending pins 65 and 66 (Fig. 5) respectively, which are adapted to be received in holes 69 and 70, respectively, provided in the upper faces of the clamping jaws 35 and 36. The pins 65 and 66 are secured to the bottom edges of gauge plates 67 and 68, respectively, which are secured to and project upwardly from the flanges 57 and 58, respectively.

To yieldably retain the inserts against accidental movement in the axial direction, spring pressed balls 71 and 72 (Fig. 3) are provided in the jaws 35 and 36, respectively, for engaging in depressions provided therefor in the outer, peripheral faces of the inserts. Hence, when the inserts have been inserted in the jaws with the flanges 57 and 58 pressed downwardly into engagement with the top faces of the jaws 35 and 36, the balls 71 and 72 will snap into the depressions provided therefor in the inserts and yieldingly retain them against upward movement.

The construction of the flaring cone 12 is best shown in Fig. 5 which is a cross-sectional elevation taken through the tool along the line 5—5 in Fig. 2. As herein shown, the cone is provided with a central stem 75 which may be formed integrally with the threaded spindle 76 which screws into an internally threaded sleeve 77 journaled in the crossbar 16. The upward pressure of the cone is taken up by an anti-friction bearing 78 interposed between a flange 79 formed on the lower end of the sleeve and the bottom face of the crossbar 16. The sleeve is retained within the aperture provided therefor in the crossbar by a snap ring 80 fitted on the upper end of the sleeve. Intermediate the stem 75 and the threaded spindle 76 is a hexagonal shank 81 which matches a hexagonal opening provided in a cap 82. The cap is held in place on top of the cone by a nut 83 which screws down against the cap and holds it against an offset 84 formed at the upper end of the stem 75.

The flaring cone is provided with three frusto-conical rollers 85 which are adapted to engage the upper end of the tube 86 (Fig. 6) held in the clamping means and roll a flare 87 thereon as the cone is fed down into the end of the tube. The lower end of each roller 85 is provided with a tenon 88 which is received in a hole provided therefor in a head 89 formed on the lower end of the stem 75. At its upper end, each roller is held in place by a screw 90 screwed into the cap 82 and projecting into a recess formed in the base end of the roller. An anti-friction bearing 91 is provided in the recess and cooperates with a tenon 92 provided on the end of the screw 90 to retain the upper end of the roller in place while permitting it to rotate freely about its longitudinal axis.

Each roller 85 is provided at its base or upper end with a conical face 95 adapted for rolling contact with a beveled face 97 formed on a bearing ring 96. The ring 96 is adapted to be retained in place on the cap 82 of the flaring cone while being free to rotate thereon by a retaining ring 98 provided with screw threads 99 adapted to mesh with corresponding threads formed on the ring 96. After the rings 96 and 98 have been screwed tightly together in place on the cap 82, as shown in Fig. 5, sufficient clearance remains between the rings and the cap to permit sliding movement of the rings thereon. The ring 96 is also provided with a beveled face 100 which serves as a gauging face for tubing of the largest size which the tool is designed to accommodate.

The flaring cone may be rotated by turning an operating handle 103 provided with a square socket for receiving a square shank 104 provided on the upper end of the spindle 76. Feeding movement of the flaring cone is controlled by a double-ended pawl 107 (Fig. 7) which is pivoted on a screw 108 (Fig. 6) threaded into the crossbar 16. The pawl is adapted to cooperate with a tooth 109 provided on the flange 79 of the threaded sleeve 77 (Fig. 5). When the spindle 76 is turned clockwise as viewed in Fig. 7, the friction between the threads on the spindle 76 and those on the sleeve 77 will cause the sleeve to turn with the spindle whereupon the tooth 109 will engage a nose 110 of the pawl and rock the pawl about the screw 108 to bring the nose 111 into the path of the tooth 109 so that the sleeve will be blocked against continued clockwise rotation. Feeding movement of the cone will now take place until the handle is turned in the opposite direction whereupon tooth 109 will rotate counterclockwise and engage beneath nose 111 to rock nose 110 into its path and thereby block the sleeve and cause feeding movement of the cone in the opposite direction.

To facilitate the formation of properly dimensioned flares on the tubing being worked with my improved tool, a gauge pin 115 is secured to the sleeve 31 (Fig. 4) on the opposite side thereof from the swing-bolt 45. The pin 115 will thereby be swung from its inactive position, shown in Fig. 2, to an active position, shown in Fig. 4, when the swing-bolt is swung outward to permit the clamping jaws to be opened. In its active position, the gauging pin will lie above the clamping recess provided by the inserts 55 and 56 and thereby act as a stop for the tube to be flared so that the upper end of the tube will be located a predetermined distance above the tops of the inserts and cause a correctly dimensioned flare to be produced by the cone when it is brought down against the gauging plates 67 and 68.

To facilitate the use of the tool, a handle 117 is screwed into the clamping jaw 35 which, since it remains stationary with respect to the legs 14 and 15, may be considered the stationary jaw of the clamping means. By holding the handle 117, the user of the tool may prevent it from turning as he rotates the handle 103 to feed the flaring cone into the end of the tube. The handle 117 also provides a convenient means for carrying the tool and moving it about.

The operation of my improved tube working tool is as follows: The tool is prepared for a tube flaring operation by loosening the wing nut 50 and the wing nut 51 and turning the swing-bolt 45 to the position shown in Fig. 4 so that the jaw 36 may be pulled away from the jaw 35 as shown in that figure. The user of the tool then removes the inserts 55 and 56 if these do not happen to correspond with the size of tubing to be flared, the inserts being removed by pulling them vertically upward to disengage the pins 65 and 66 from the holes in the clamping jaws and the slots 61 and 62 from the retaining lugs 59 and 60, respectively. When the pins and lugs have thus been disengaged, the inserts will be freed from their respective jaws and may be directly removed therefrom. Thereafter, inserts of the proper size for clamping the tube to be flared are inserted in the jaws by engaging the grooves 61 and 62 behind the retaining lugs 59 and 60 and sliding the inserts downwardly into position with the pins 65 and 66 engaging in the holes in the clamping jaws. The inserts will be held in place by the spring pressed balls 71 and 72 engaging in the depressions in the faces of the inserts. The tube to be flared is now inserted between the jaws and the jaw 36 swung closed. Before turning the swing-bolt 45 to its clamping position, however, the tubing to be flared is pushed up until the end thereof strikes the gauging pin 115 so as to insure that the upper end of the tube lies at the correct height above the top faces of the inserts. The swing-bolt 45 is now swung to its Fig. 3 position thereby moving the gauging pin 115 to its inactive position shown in Fig. 2 where it will not interfere with the flaring cone. The wing nut 51 is now tightened to clamp the tube between the jaws, after which the wing nut 50 is tightened to apply greatly increased pressure to the tubing and insure that it will not slip between the jaws when the flaring cone is forced therein. The handle 103 is now turned clockwise to cause the tooth 109 (Fig. 7) to engage against the nose 111 and stop rotation of the sleeve 79 so that downward feeding movement of the flaring cone will take place. As the cone moves into the end of the tube, the rollers 85 will produce a flare 87 (Fig. 6) on the end of the tube. After a flare of the correct size has been produced, the bearing ring 96 will engage against the upper edge of the gauging plates 67 and 68 and prevent further downward travel of the cone. The operator may then reverse the direction of rotation of the handle 103, the first two revolutions being idle so far as feeding movement of the cone is concerned. This provides burnishing of the flare after which the tooth 109 will engage the nose 110 and prevent further counterclockwise rotation of the sleeve 79 so that upward feeding movement will take place. After the cone has been removed from the end of the tube, the wing nut 50 is loosened first and then the wing nut 51 so as to enable swing-bolt 45 to be turned to its Fig. 4 position. The jaw 36 is then swung open and the flared tube removed from the tool.

It will, of course, be appreciated from the foregoing description of the construction and operation of my tool that the gauging plates 67 and 68 will vary in height with each size of insert so as to provide a properly dimensioned flare on each of the different sizes of tubing handled by the tool.

In the case of the largest size of tubing which the tool is designed to handle, the gauging plates 67 and 68 may be omitted, the beveled face 100 on the bearing ring 96 (Fig. 5) being adapted to contact the upper end of the tube as it is flared, thereby limiting the downward travel of the cone to the proper extent to produce a flare of the required size thereon. In either event, that is, whether the beveled face 100 of the ring 96 contacts the end of the tube, or whether the bottom face 101 of the ring contacts the upper edges of the gauging plates 67 and 68, the engagement of the face 97 on the ring with the conical surfaces 95 on the flaring cones will provide rolling contact between the ring and the flaring cone and prevent any binding of the cone against the gauging plates or against the upper end of the tube.

While I have described my invention in connection with one possible form or embodiment thereof and have used, therefore, certain specific terms and language herein, it is to be understood that the present disclosure is illustrative rather than restrictive and that changes and modifications may be resorted to without departing from the spirit or scope of the claims which follow.

Having thus described my invention, what I claim as new and useful and desire to secure by United States Letters Patent, is:

1. In a tube flaring tool having a yoke, a tube clamping means fastened to the legs of said yoke, and a flaring cone supported by said yoke for combined rotary and axial feeding movement relative to the end of a tube held in said clamping means, the combination of a pair of tubing clamping inserts adapted to be received in said clamping means, a fixed gauge plate projecting axially from the end of at least one of said inserts, an abutment ring mounted on said cone for rotation relative thereto, and an annular contact face on said abutment ring adapted to cooperate with said plate to limit the downward travel of said cone.

2. In a tube flaring tool having a yoke, a tube clamping means fastened to the legs of said yoke, and a flaring cone supported by said yoke for combined rotary and axial feeding movement relative to the end of a tube held in said clamping means, the combination of a pair of tube clamping inserts adapted to be received in said clamping means, a gauge plate projecting axially from the end of at least one of said inserts, an annular contact face on said cone adapted to cooperate with said plate to limit the downward travel of said cone, a swing bolt for tightening said clamping means, said swing bolt being turnable from a clamping position to a releasing position, and a gauging element which moves with said swing bolt from its clamping position, in which said gauging element lies over the end of the tube in the clamping means and serves as a gauge stop therefor, to its releasing position, in which said gauging element lies out of the path of the tube.

3. The tube flaring tool of claim 2 wherein said gauge plate extends peripherally around a substantial portion of said insert, said plate being interrupted at the end thereof lying adjacent said swing bolt to permit turning movement of said gauging element into and out of gauging position over the end of the tube without interference by said plate.

4. In a tube flaring tool having a yoke, a tube clamping means fastened to the legs of said yoke, and a flaring cone supported on said yoke for combined rotary and axial feeding movement into the end of a tube held in said clamping means, the combination of gauging means for determining the size of the flare produced by said flaring cone, said means including an abutment ring, means rotatably mounting said abutment ring on said cone for rotation relative thereto, a stationary gauging element, said stationary gauging element mounted on said clamping means and adapted to cooperate with said abutment ring to limit the downward feeding movement of said cone into the tube, said flaring cone including a plurality of rollers for forming the flare on the tube, and a face on said abutment ring adapted to bear against said rollers and provide rolling contact between said ring and said rollers.

5. In a tube flaring tool having a yoke, a tube clamping means fastened to the legs of said yoke, and a flaring cone supported on said yoke for combined rotary and axial feeding movement into the end of a tube held in said clamping means, the combination of gauging means for determining the size of the flare produced by said flaring cone, said means including an abutment ring, means rotatably mounting said abutment ring on said cone for rotation relative thereto, a stationary gauging element, said stationary gauging element mounted on said clamping means and adapted to cooperate with said abutment ring to limit the downward feeding movement of said cone into the tube, said abutment ring being provided with an annular face disposed at right angles to the sides of the flaring cone adapted to contact the flared end of the largest diameter of tubing handled by the tool and thereby limit the size of the flare produced on the tube.

6. A flaring cone for a tube flaring tool comprising a plurality of rollers journaled for rotation on said cone for forming the flare on the tube, an abutment ring freely rotatable on said cone, said abutment ring having an annular face thereon, each of said rollers having its upper end adapted to bear against the annular face of said ring and provide rolling contact between said ring and said rollers.

References Cited in the file of this patent

UNITED STATES PATENTS

| | | |
|---|---|---|
| 841,388 | Gapp | Jan. 15, 1907 |
| 989,805 | Reynolds | Apr. 18, 1911 |
| 1,372,197 | Rudolph | Mar. 22, 1921 |
| 1,383,840 | Mueller | July 5, 1921 |
| 1,472,278 | Mueller | Oct. 30, 1923 |
| 1,543,583 | Mason | June 23, 1925 |
| 1,658,075 | Butt | Feb. 7, 1928 |
| 1,660,708 | Grant | Feb. 28, 1928 |
| 1,725,458 | Krell | Aug. 20, 1929 |
| 1,765,704 | Schultis | June 24, 1930 |
| 1,796,984 | Donnelly | Mar. 17, 1931 |
| 1,823,966 | Burt | Sept. 22, 1931 |
| 1,827,733 | Cornell | Oct. 20, 1931 |
| 1,829,373 | Samson | Oct. 27, 1931 |
| 1,834,316 | McLagan | Dec. 1, 1931 |
| 1,864,864 | Smith | June 28, 1932 |
| 1,921,281 | Carlson | Aug. 8, 1933 |
| 2,048,209 | Young | July 21, 1936 |
| 2,117,543 | Corrigan | May 17, 1938 |
| 2,156,384 | Fluellen | May 2, 1939 |
| 2,211,242 | McIntosh | Aug. 13, 1940 |
| 2,381,747 | Howe | Aug. 7, 1945 |
| 2,505,665 | Franck | Apr. 25, 1950 |
| 2,623,257 | Moon | Dec. 30, 1952 |
| 2,654,414 | Tomarin | Oct. 6, 1953 |
| 2,711,576 | Wilson | June 28, 1955 |
| 2,711,773 | Wilson | June 28, 1955 |
| 2,711,774 | Wilson | June 28, 1955 |
| 2,773,539 | Franck | Dec. 11, 1956 |

FOREIGN PATENTS

| | | |
|---|---|---|
| 769,073 | France | June 5, 1934 |
| 570,093 | Great Britain | June 21, 1945 |